United States Patent
Kim et al.

(10) Patent No.: US 11,492,437 B2
(45) Date of Patent: Nov. 8, 2022

(54) METHOD OF PREPARING ASA GRAFT COPOLYMER, METHOD OF PREPARING THERMOPLASTIC RESIN COMPOSITION INCLUDING ASA GRAFT COPOLYMER, AND METHOD OF MANUFACTURING MOLDED ARTICLE USING THERMOPLASTIC RESIN COMPOSITION

(71) Applicant: LG CHEM, LTD., Seoul (KR)

(72) Inventors: Min Jung Kim, Daejeon (KR); Yong Yeon Hwang, Daejeon (KR); Hyun Taek Oh, Daejeon (KR); Bong Keun Ahn, Daejeon (KR); Chun Ho Park, Daejeon (KR); Eun Soo Kang, Daejeon (KR); Yong Hee An, Daejeon (KR); Jang Won Park, Daejeon (KR)

(73) Assignee: LG CHEM, LTD., Seoul (KR)

( * ) Notice: Subject to any disclaimer, the term of this patent is extended or adjusted under 35 U.S.C. 154(b) by 1092 days.

(21) Appl. No.: 16/084,940

(22) PCT Filed: Jan. 12, 2018

(86) PCT No.: PCT/KR2018/000591
§ 371 (c)(1),
(2) Date: Sep. 13, 2018

(87) PCT Pub. No.: WO2018/174395
PCT Pub. Date: Sep. 27, 2018

(65) Prior Publication Data
US 2021/0171695 A1    Jun. 10, 2021

(30) Foreign Application Priority Data

Mar. 20, 2017  (KR) .................. 10-2017-0034357

(51) Int. Cl.
| | | |
|---|---|---|
| *C08K 5/092* | (2006.01) | |
| *C08F 285/00* | (2006.01) | |
| *B29C 45/00* | (2006.01) | |
| *C08L 25/12* | (2006.01) | |
| *C08L 51/04* | (2006.01) | |
| *B29K 96/02* | (2006.01) | |
| *B29K 105/00* | (2006.01) | |

(52) U.S. Cl.
CPC ........ *C08F 285/00* (2013.01); *B29C 45/0001* (2013.01); *C08K 5/092* (2013.01); *C08L 25/12* (2013.01); *C08L 51/04* (2013.01); *B29K 2096/02* (2013.01); *B29K 2105/0085* (2013.01)

(58) Field of Classification Search
CPC ........ C08F 2/26; C08F 285/00; C08F 212/08; C08F 220/44; B29C 45/0001; C08L 51/04; C08L 25/12; C08K 5/092; B29K 2105/0085; B29K 2096/02
See application file for complete search history.

(56) References Cited

U.S. PATENT DOCUMENTS

| | | | |
|---|---|---|---|
| 6,803,615 B1 * | 10/2004 | Sin | H01L 43/08 257/E27.005 |
| 6,806,315 B2 | 10/2004 | Shin et al. | |
| 7,393,891 B2 | 7/2008 | O et al. | |
| 10,487,204 B2 * | 11/2019 | Ahn | C08F 265/06 |
| 2003/0153710 A1 | 8/2003 | Shin et al. | |

FOREIGN PATENT DOCUMENTS

| | | |
|---|---|---|
| CN | 1127762 A | 7/1996 |
| CN | 103649140 A | 3/2014 |
| CN | 103764700 A | 4/2014 |
| CN | 104066757 A | 9/2014 |
| JP | 2004521995 A | 7/2004 |
| JP | 2006509101 A | 3/2006 |
| JP | 2007070393 A | 3/2007 |
| JP | 2009540045 A | 11/2009 |
| JP | 4932199 B2 | 5/2012 |
| KR | 10-0358230 | 2/2003 |
| KR | 10-0815995 B1 | 3/2008 |
| KR | 10-0822143 | 4/2008 |

(Continued)

OTHER PUBLICATIONS

Search Report dated Feb. 26, 2020 for European Application No. 18759013.8.

(Continued)

*Primary Examiner* — Monica A Huson

(57) ABSTRACT

The present invention relates to a method of preparing an ASA graft copolymer, a method of preparing a thermoplastic resin composition including the ASA graft copolymer, and a method of manufacturing a molded article using the thermoplastic resin composition. More particularly, the present invention provides an ASA graft copolymer having improved thermal stability through addition of an emulsifier in a specific amount range in a seed preparation step and introduction of a multifunctional carboxylic acid having 20 or more carbon atoms or a salt thereof, as an emulsifier, in a shell preparation step and a high-quality thermoplastic resin composition exhibiting excellent impact resistance, such as impact strength and tensile strength, and excellent appearance, such as surface gloss, whiteness, and retention-associated heat discoloration, and causing considerable reduction in the amount of gas generated on a surface of a resin during a high-temperature thermoforming process due to inclusion of the ASA graft copolymer.

16 Claims, No Drawings

(56) References Cited

FOREIGN PATENT DOCUMENTS

| KR | 20090038507 A | 4/2009 |
|----|---------------|--------|
| KR | 10-2014-0096748 A | 8/2014 |
| KR | 10-2015-0037378 A | 4/2015 |
| KR | 10-2015-0037379 A | 4/2015 |
| KR | 10-2015-0038975 A | 4/2015 |
| KR | 10-1530150 | 6/2015 |
| WO | WO2007142473 A1 | 12/2007 |

OTHER PUBLICATIONS

International Search Report for PCT/KR2018/000591 filed on Jan. 12, 2018.
Office Action dated Jul. 24, 2020 for Chinese Application 201880001670.1.

* cited by examiner

METHOD OF PREPARING ASA GRAFT COPOLYMER, METHOD OF PREPARING THERMOPLASTIC RESIN COMPOSITION INCLUDING ASA GRAFT COPOLYMER, AND METHOD OF MANUFACTURING MOLDED ARTICLE USING THERMOPLASTIC RESIN COMPOSITION

CROSS-REFERENCE TO RELATED APPLICATION

This application is a U.S. National Stage of PCT/KR2018/000591 filed Jan. 12, 2018, which claims priority to Korean Patent Application No. 10-2017-0034357, filed on Mar. 20, 2017 in the Korean Intellectual Property Office, the disclosures of which are incorporated herein by reference.

TECHNICAL FIELD

The present invention relates to a method of preparing an ASA graft copolymer, a method of preparing a thermoplastic resin composition including the ASA graft copolymer, and a method of manufacturing a molded article using the thermoplastic resin composition. More particularly, the present invention provides an ASA graft copolymer having improved thermal stability in high yield, a high-quality thermoplastic resin composition exhibiting improved appearance characteristics, such as colorability, surface gloss, and retention-associated heat discoloration, along with excellent weather resistance and impact resistance due to inclusion of the ASA graft copolymer, and a greatly reduced gas generation amount during thermoforming at high temperature, and a method of manufacturing a molded article using the thermoplastic resin composition.

BACKGROUND ART

In general, ABS resins, which are obtained by graft-copolymerizing an aromatic vinyl monomer and a vinyl cyan monomer to a diene rubber polymer prepared by polymerizing conjugated diene monomer, have excellent impact resistance and processability, and have excellent mechanical strength, heat deflection temperature, and colorability. Thus, ABS resins have been widely used in electric and electronic products, automobile parts, and office equipment. However, since rubber polymers used in preparation of ABS resins contain chemically unstable unsaturated bonds, there is a problem that rubber polymers are easily aged by ultraviolet light and thus the weather resistance of ABS resins is very weak.

To overcome such disadvantages, there has been proposed a method of adding a stabilizer capable of improving weather resistance when a resin composition is prepared by extruding an ABS resin, but the effect thereof was insufficient and the problem of being vulnerable to ultraviolet light was still not solved. Thus, a method, in which a polymer obtained by mixing and polymerizing a diene monomer and an acrylic monomer is used or a chemically more stable acrylic rubber polymer is used instead of a diene rubber polymer containing double bonds, has been proposed.

A representative example of a weather-resistant thermoplastic resin using an acrylic rubber polymer containing no unstable double bond is an acrylate-styrene-acrylonitrile (ASA) copolymer. Since an ASA copolymer does not contain unstable double bonds therein, it has excellent weather resistance, chemical resistance, and thermal stability, and thus, it has been widely used in fields requiring such properties, for example, outdoor electric and electronic parts, building materials, farm equipment, ASA/ABS double layer sheets, profile extrusion, road signs, outdoor products, PVC for construction materials, leisure goods, sporting goods, automobile parts, and the like.

Meanwhile, as an emulsifier for preparing the ASA copolymer and similar ASA resins, low-molecular-weight carboxylates having 20 or fewer carbon atoms, such as sodium rosinate, potassium rosinate, sodium laurate, potassium laurate, sodium oleate, potassium oleate, and potassium stearate, alkyl sulfosuccinic acid dipotassium salts having 12 to 18 carbon atoms, and sulfur-containing emulsifiers, such as alkyl sulfate or alkyl ester sulfate having 12 to 20 carbon atoms, have been used.

However, the conventional emulsifier is used in a large amount to sufficiently secure the stability of latex. As a result, the emulsifier remains in the latex and a resin after polymerization, and thus, gas is significantly generated on the surface of the resin during a high-temperature thermoforming process, which may reduce thermal stability and surface properties of the resin.

Recently, ASA resins have been applied to thin film products such as sidings, sheets, and co-extrusion films. Accordingly, there is an urgent need for a technique of reducing the amount of gas generated in a molding process by reducing residues in a resin to improve thermal stability and appearance characteristics.

PRIOR ART DOCUMENT

[Patent Document] (Patent Document 1) KR 10-0815995 B1

DISCLOSURE

Technical Problem

Therefore, the present invention has been made in view of the above problems, and it is one object of the present invention to provide a method of preparing an ASA graft copolymer capable of increasing thermal stability by reducing undesired residues remaining in a latex while excellently maintaining inherent properties, such as weather resistance, chemical resistance, and mechanical strength, of an ASA resin, and thus, reducing the amount of gas generated on a surface of the resin during a high-temperature thermoforming process and, ultimately, allowing production of a resin composition having improved appearance characteristics.

It is another object of the present invention to provide a thermoplastic resin composition exhibiting improved appearance characteristics, such as surface gloss, whiteness, and retention-associated heat discoloration, along with excellent weather resistance, chemical resistance, mechanical properties, and the like due to inclusion of an ASA graft copolymer prepared according to the method, and a method of manufacturing a molded article using the thermoplastic resin composition.

The above and other objects can be accomplished by the present disclosure described below.

Technical Solution

In accordance with one aspect of the present invention, provided is a method of preparing an ASA graft copolymer, the method including a) a seed preparation step of preparing seeds by polymerizing one or more monomers selected from among an aromatic vinyl monomer, a vinyl cyan monomer, and an alkyl acrylate monomer and an emulsifier; b) a core preparation step of preparing cores enclosing the seeds by adding an alkyl acrylate monomer in the presence of the seeds and performing polymerization; and c) a shell preparation step of preparing shells enclosing the cores by adding an aromatic vinyl monomer, a vinyl cyan monomer, and an emulsifier in the presence of the cores and performing graft polymerization, wherein the emulsifier of the shell preparation step includes a multifunctional carboxylic acid having 20 to 60 carbon atoms or a salt thereof, and an average size of the shell is 250 to 750 nm (larger than an average size of the cores).

In accordance with another aspect of the present invention, provided is a method of preparing a thermoplastic resin composition, the method including a step of kneading 20 to 60% by weight of the ASA graft copolymer prepared by the method and 40 to 80% by weight of a vinyl cyan monomer-aromatic vinyl monomer copolymer.

In accordance with yet another aspect of the present invention, provided is a method of manufacturing a molded article, the method including a step of injection-molding the thermoplastic resin composition according to the method.

Advantageous Effects

As apparent from the foregoing, the present invention advantageously provides a method of preparing a multilayered ASA graft copolymer including a seed, a core, and a shell. Particularly, the present invention provides an ASA graft copolymer exhibiting improved appearance characteristics, such as surface gloss, whiteness, and retention-associated heat discoloration, while excellently maintaining inherent properties thereof, such as mechanical strength and weather resistance, in high yield through minimization of the use of a conventional emulsifier deteriorating thermal stability and use of a multifunctional carboxylic acid having 20 or more carbon atoms or a salt thereof, as an emulsifier used in a shell preparation step, to reduce the amount of undesired residues remaining in a latex.

BEST MODE

Hereinafter, a method of preparing an ASA graft copolymer and a method of preparing a thermoplastic resin composition including the ASA graft copolymer of the present invention are described in detail.

The present inventors confirmed that thermal stability and the like of the ASA graft copolymer may be improved while highly maintaining polymerization stability and the stability of a latex by using a multifunctional carboxylic acid having 20 or more carbon atoms or a salt thereof, as an emulsifier, in a shell preparation step upon preparation of a multilayered ASA graft copolymer including seeds, cores, and shells, whereby a gas generation amount is ultimately reduced during injection molding of a final resin composition and appearance characteristics, such as surface gloss and whiteness, are ultimately improved. Based on these findings, the present inventors continued further study and completed the present invention.

The method of preparing an ASA graft copolymer includes a) a seed preparation step of preparing seeds by polymerizing one or more monomers selected from among an aromatic vinyl monomer, a vinyl cyan monomer, and an alkyl acrylate monomer and an emulsifier; b) a core preparation step of preparing cores enclosing the seeds by adding an alkyl acrylate monomer in the presence of the seeds and performing polymerization; and c) a shell preparation step of preparing shells enclosing the cores by adding an aromatic vinyl monomer, a vinyl cyan monomer, and an emulsifier in the presence of the cores and performing graft polymerization, wherein the emulsifier of the shell preparation step includes a multifunctional carboxylic acid having 20 to 60 carbon atoms or a salt thereof, and an average size of the shell is 250 to 750 nm (larger than an average size of the cores).

Hereinafter, each step of the method of preparing an ASA graft copolymer of the present invention is described in detail.

a) Seed Preparation Step

In the seed preparation step of the present invention, seeds may be prepared, for example, by polymerizing 4 to 30 parts by weight of one or more monomers selected from among an aromatic vinyl monomer, a vinyl cyan monomer, and an alkyl acrylate monomer and 0.005 to 0.5 parts by weight of an emulsifier based on 100 parts by weight of the sum of the monomers used to prepare the graft copolymer.

In the seed preparation step, the monomer may be added, for example, in an amount of 4 to 30 parts by weight, 4 to 20 parts by weight, 4 to 15 parts by weight or 4 to 10 parts by weight based on 100 parts by weight of the sum of the monomers used to prepare the graft copolymer. Within this range, balance of properties, such as impact resistance and weather resistance, of a final ASA graft copolymer is excellent.

The monomer of the seed preparation step may be, for example, an alkyl acrylate monomer or a mixture of an alkyl acrylate monomer and one or more monomers selected from an aromatic vinyl monomer and a vinyl cyan monomer. In this case, a final ASA graft copolymer exhibits excellent properties such as impact resistance and weather resistance.

The alkyl acrylate monomer may be, for example, an alkyl acrylate monomer including a chain alkyl group having 1 to 20 carbon atoms or a branched alkyl group having 3 to 20 carbon atoms. The alkyl acrylate monomer is preferably an acrylate monomer including a chain alkyl group having 1 to 4 carbon atoms.

As a specific example, the alkyl acrylate monomer may be one or more selected from among methyl acrylate, ethyl acrylate, propyl acrylate, butyl acrylate, hexyl acrylate, octyl acrylate, and 2-ethylhexyl acrylate, but the present invention is not limited thereto. The alkyl acrylate monomer preferably includes butyl acrylate.

The aromatic vinyl monomer may be, for example, one or more selected from among styrene, α-methyl styrene, p-methyl styrene, and vinyl toluene, but the present invention is not limited thereto. The aromatic vinyl monomer preferably includes styrene.

The vinyl cyan monomer may be, for example, one or more selected from among acrylonitrile, methacrylonitrile, and ethacrylonitrile, and preferably includes acrylonitrile, but the present invention is not limited thereto.

In the seed preparation step, an average size of the seeds may be adjusted by controlling a use amount of the emulsifier. The emulsifier may be added, for example, in an amount of 0.005 to 0.5 parts by weight, 0.01 to 0.4 parts by weight, 0.01 to 0.29 parts by weight, 0.01 to 0.25 parts by weight, 0.01 to 0.15 parts by weight, 0.03 to 0.1 parts by weight, 0.04 to 0.1 parts by weight, 0.03 to 0.08 parts by weight, or 0.04 to 0.08 parts by weight based on 100 parts by weight of the sum of the monomers used to prepare the graft copolymer.

When the emulsifier is added within these ranges in the seed preparation step, an ASA graft copolymer having a desired average size may be easily obtained. Ultimately, mechanical strength, such as impact strength, of a final product is excellent, and a gas generation amount is reduced during thermoforming at high temperature.

The emulsifier of the seed preparation step is not specifically limited so long as it is generally used in the technical field to which the present invention pertains. The emulsifier is preferably one or more selected from a monocarboxylate having 20 or fewer carbon atoms, an alkyl sulfosuccinate metal salt having 12 to 18 carbon atoms, an alkyl sulfate ester having 12 to 20 carbon atoms, an alkyl sulfonic acid metal salt having 12 to 20 carbon atoms, and derivatives thereof and most preferably includes an alkyl sulfonic acid metal salt having 12 to 20 carbon atoms.

In the present disclosure, the expression "derivative" refers to a compound wherein one or more hydrogen atoms of an original compound are substituted with an alkyl group, a halogen group, a hydroxyl group, or the like.

As a specific example, the monocarboxylate having 20 or more carbon atoms may be rosinate, laurate, oleate, stearate, or the like, the alkyl sulfosuccinate metal salt having 12 to 18 carbon atoms may be a dicyclohexyl sulfosuccinate metal salt, a dihexyl sulfosuccinate metal salt, a di-2-ethyl hexyl sulfosuccinate metal salt, a dioctyl sulfosuccinate metal salt, or the like, and the alkyl sulfate ester having 12 to 20 carbon atoms and the alkyl sulfonic acid metal salt having 12 to 20 carbon atoms may be sodium lauryl sulfate, sodium dodecyl sulfate, sodium dodecyl benzene sulfate, sodium octadecyl sulfate, sodium oleic sulfate, potassium dodecyl sulfate, potassium octadecyl sulfate, or the like, but the present invention is not limited thereto.

In the seed preparation step of the present invention, the initiator may be included in an amount of 0.01 to 3 parts by weight or 0.01 to 1 part by weight. Within this range, polymerization stability and efficiency are excellent.

The initiator is not specifically limited so long as it is generally used in the technical field to which the present invention pertains. The initiator is preferably a water-soluble initiator, such as sodium persulfurate, potassium persulfate, ammonium persulfurate, potassium perphosphate, or hydrogen peroxide, or may be one or more selected from fat-soluble initiators including t-butyl peroxide, cumene hydroperoxide, p-methane hydroperoxide, di-t-butyl peroxide, t-butylcumyl peroxide, acetyl peroxide, isobutyl peroxide, octanoyl peroxide, dibenzoyl peroxide, diisopropylbenzene hydroperoxide, 3,5,5-trimethylhexanol peroxide, t-butyl peroxy isobutylate, azobisisobutyronitrile, azobis-2,4-dimethylvaleronitrile, azobiscyclohexanecarbonitrile, and azobisisobutyric acid (butyl acid) methyl, and the like.

As a preferred embodiment, the initiator of the seed preparation step may be a water-soluble initiator such as potassium persulfate. In this case, an initial reaction rate of polymerization may be easily controlled, whereby a polymer having a desired particle diameter may be easily prepared and the properties of the ASA graft copolymer may be improved.

In the seed preparation step, one or more selected from among a crosslinking agent, a grafting agent, and an electrolyte may be optionally, further included. Preferably, all of a crosslinking agent, a grafting agent, and an electrolyte are included.

The crosslinking agent may be included, for example, in an amount of 0.01 to 1 part by weight or 0.01 to 0.5 parts by weight based on 100 parts by weight of the sum of the monomers used to prepare the graft copolymer.

The crosslinking agent, for example, may include an unsaturated vinyl group, and an acrylic compound capable of acting as a crosslinking agent may be used as the crosslinking agent. As a particular example, one or more selected from the group consisting of polyethylene glycol diacrylate, polyethylene glycol dimethacrylate, polypropylene glycol diacrylate, polypropylene glycol dimethacrylate, ethylene glycol diacrylate, ethylene glycol dimethacrylate, divinylbenzene, diethylene glycol dimethacrylate, triethylene glycol dimethacrylate, 1,3-butanediol dimethacrylate, hexanediol propoxylate diacrylate, neopentyl glycol dimethacrylate, neopentyl glycol ethoxylate diacrylate, neopentyl glycol propoxylate diacrylate, trimethylolpropane trimethacrylate, trimethylolmethane triacrylate, trimethylpropane ethoxylate triacrylate, trimethylpropane propoxylate triacrylate, pentaerythritol ethoxylate triacrylate, pentaerythritol propoxylate triacrylate, and vinyltrimethoxysilane may be used as the crosslinking agent, without being limited thereto.

The electrolyte may be used, for example, in an amount of 0.001 to 1 part by weight, 0.005 to 1 part by weight, or 0.05 to 0.5 parts by weight. Within this range, polymerization stability and stability of latex may be increased and a graft copolymer having a desired particle diameter may be easily prepared.

The electrolyte may be, for example, one or more selected from the group consisting of KCl, NaCl, $KHCO_3$, $NaHCO_3$, $K_2CO_3$, $Na_2CO_3$, $KHSO_3$, $NaHSO_3$, $K_4P_2O_7$, $Na_4P_2O_7$, $K_3PO_4$, $Na_3PO_4$, $K_2HPO_4$, $Na_2HPO_4$, KOH, NaOH, and $Na_2S_2O_7$, but the present invention is not limited thereto.

The grafting agent may be used, for example, in an amount of 0.01 to 3 parts by weight, 0.01 to 1 part by weight, or 0.01 to 0.1 parts by weight. Within this range, a grafting degree of the ASA graft polymer may be increased and the ASA graft polymer exhibits excellent properties.

A compound including an unsaturated vinyl group having two or more different reactivities may be used as the grafting agent. For example, the grafting agent may be one or more selected from allyl methacrylate, triallyl isocyanurate, triallyl amine, and diallyl amine, without being limited thereto.

The seed preparation step may be carried out, for example, at a reaction temperature of 40 to 80° C. or 50 to 75° C. The initiator is preferably added after the temperature of the reactants reaches the reaction temperature range so as to secure polymerization stability and allow formation of seeds with a uniform size.

Seeds obtained by the seed preparation step are characterized by having, for example, an average size of 90 to 400 nm, 150 to 300 nm, or 150 to 250 nm. Within this range, an ASA graft copolymer having a desired particle diameter may be prepared, and mechanical properties, such as impact resistance, of a final molded article are excellent.

b) Core Preparation Step

The core preparation step of the present invention is a step of forming cores enclosing the seeds by adding an alkyl acrylate monomer and performing polymerization in the presence of the seeds.

For example, in the core preparation step, cores may be formed by polymerizing 30 to 60 parts by weight, 40 to 60 parts by weight, or 40 to 50 parts by weight of an alkyl acrylate monomer with 0.01 to 1 part by weight, 0.05 to 1 part by weight, or 0.1 to 0.5 parts by weight of a crosslinking agent based on 100 parts by weight of the sum of the monomers used to prepare the graft copolymer in the presence of the seeds. Within this range, an ASA graft copolymer exhibiting excellent reaction balance and excellent properties, such as impact resistance and weather resistance, may be prepared.

In the core preparation step, for example, 0.1 to 1 part by weight of an emulsifier, 0.01 to 1 part by weight of a grafting agent, and 0.005 to 0.1 parts by weight of an initiator may be further included.

The alkyl acrylate monomer, crosslinking agent, emulsifier, grafting agent, and initiator used in the core preparation step may be, for example, the same as those used in the seed preparation step.

In the core preparation step, for example, it may be preferred to mix the reactants added for polymerization in a separate reactor, and then continuously feed the mixture in terms of securement of reaction balance and polymerization stability.

In the present invention, continuous feed is different from batch feed. According to continuous feed, materials to be supplied to a reactor may be continuously fed for a predetermined period of time, e.g., for 30 or more minutes, 60 or more minutes, or 90 or more minutes after start of the reaction to 3 or less hours or 2 or less hours before the end of the reaction, without a rest period, or may be fed dropwise.

The continuous feeding may be performed by, for example, feeding the reactants at a rate of 5 to 50 parts by weight/hr or 10 to 25 parts by weight/hr.

The cores obtained by the core preparation step may be characterized by having, for example, an average size of 180 to 600 nm, 250 to 550 nm, or 300 to 500 nm (an average size of the cores is larger than that of the seeds). Within this range, the stability of a latex is excellent and the polymer exhibits excellent impact resistance, weather resistance, appearance characteristics, and the like.

c) Shell Preparation Step

In the present invention, the shell preparation step is a step of forming shells enclosing the cores by graft-polymerizing an aromatic vinyl monomer, a vinyl cyan monomer, and an emulsifier in the presence of the cores. Here, the emulsifier may be characterized by including a multifunctional carboxylic acid having 20 to 60 carbon atoms or a salt thereof.

For example, in the shell preparation step, shells may be prepared by graft-polymerizing 30 to 60 parts by weight, 40 to 60 parts by weight or 45 to 55 parts by weight of an aromatic vinyl monomer and a vinyl cyan monomer; and 0.1 to 3 parts by weight, 0.5 to 2 parts by weight, 0.5 to 0.15 parts by weight or 0.8 to 0.15 parts by weight of an emulsifier in the presence of the cores.

The emulsifier of the shell preparation step includes a multifunctional carboxylic acid having 20 to 60 carbon atoms or a salt thereof. Here, the multifunctional carboxylic acid having 20 to 60 carbon atoms or a metal salt thereof may be, for example, one or more selected from a multifunctional carboxylic acid having 20 to 60 carbon atoms, a multifunctional carboxylic acid having 21 to 60 carbon atoms, a multifunctional carboxylic acid having 20 to 55 carbon atoms, a multifunctional carboxylic acid having 21 to 55 carbon atoms, a multifunctional carboxylic acid having 30 to 60 carbon atoms, a multifunctional carboxylic acid having 35 to 55 carbon atoms, and salts thereof. Due to inclusion of the multifunctional carboxylic acid or a salt thereof as the emulsifier, thermal stability of a final graft copolymer is improved, and the amount of gas generated during injection molding is ultimately reduced, whereby appearance characteristics, such as surface gloss and whiteness, are excellent.

For example, at least 2 or more carboxyl groups, preferably 2 or 3 carboxyl groups, may be included in a structure of the multifunctional carboxylic acid having 20 to carbon atoms or a salt thereof. By using the multifunctional carboxylic acid having 20 to 60 carbon atoms or a salt thereof as an emulsifier, thermal stability of a final graft copolymer is improved, and the amount of gas generated during a high-temperature thermoforming process is reduced, whereby a molded article having excellent appearance quality may be provided.

In the present invention, the multifunctional carboxylic acid includes a derivative or anhydride thereof.

As a specific example, the multifunctional carboxylic acid having 20 to 60 carbon atoms may be one or more of compounds represented by Formulas 1 to 7 below, but the present invention is not limited thereto. Due to inclusion of the multifunctional carboxylic acid as an emulsifier, thermal stability of a final graft copolymer is improved, inherent properties, such as mechanical strength and weather resistance, of the ASA graft copolymer are excellent, and appearance characteristics, such as surface gloss and whiteness, of the ASA graft copolymer are improved.

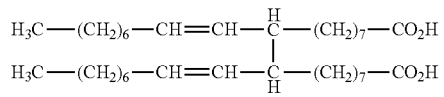

[Formula 1]

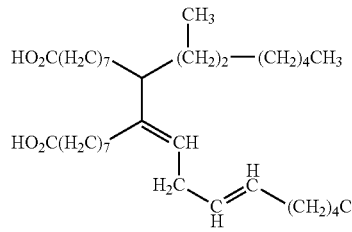

[Formula 2]

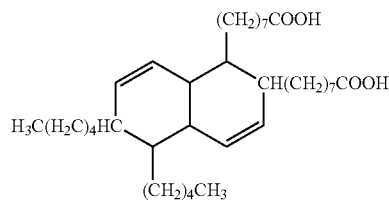

[Formula 3]

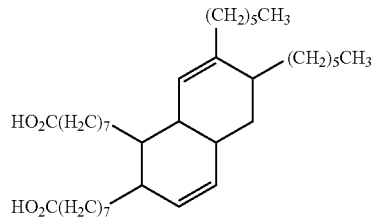

[Formula 4]

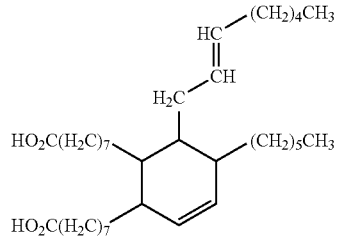

[Formula 5]

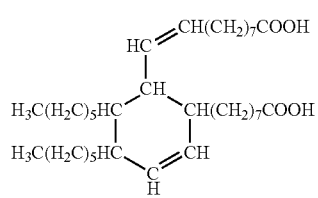

[Formula 6]

-continued

[Formula 7]

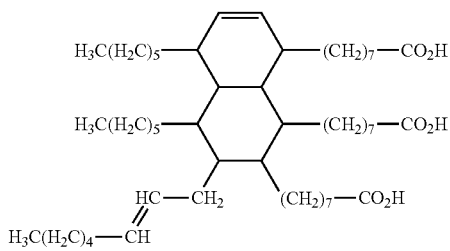

In the present invention, the salt may be a metal salt. The salt may be, for example, one or more of alkali metal salts, such as sodium and potassium, and alkaline earth metal salts, such as magnesium and calcium.

The multifunctional carboxylic acid having 20 to 60 carbon atoms or a metal salt thereof may be included, for example, in an amount of 30 to 100% by weight based on a total weight of the emulsifier of the shell preparation step. The multifunctional carboxylic acid having 20 to 60 carbon atoms or a metal salt thereof is included in an amount of more preferably 40 to 100% by weight or 50 to 100% by weight, most preferably 60 to 100% by weight or 70 to 100% by weight, based on a total weight of the emulsifier of the shell preparation step.

When a metal salt of the multifunctional carboxylic acid having 20 to 60 carbon atoms is used alone as the emulsifier of the shell preparation step, thermal stability of the ASA graft copolymer is further improved, whereby the amount of gas generated in a high-temperature thermoforming process is further decreased, and appearance characteristics of a final product are improved.

As another example, the emulsifier of the shell preparation step may be a mixture of a multifunctional carboxylic acid having 20 to 60 carbon atoms or a metal salt thereof and one or more selected from among a monocarboxylate having 20 or fewer carbon atoms, an alkyl sulfosuccinate metal salt having 12 to 18 carbon atoms, an alkyl sulfate ester having 12 to 20 carbon atoms, an alkyl sulfonic acid metal salt having 12 to 20 carbon atoms, and derivatives thereof.

As a preferred embodiment, the emulsifier of the shell preparation step may be a mixture of a multifunctional carboxylic acid having 20 to 60 carbon atoms or a salt thereof and a monocarboxylate having 10 to 20 carbon atoms.

As a specific example, a weight ratio of the multifunctional carboxylic acid having 20 to 60 carbon atoms or a salt thereof to the monocarboxylate having 10 to 20 carbon atoms may be 1:0.1 to 1:10. The weight ratio is preferably 1:0.1 to 1:5, most preferably 1:0.1 to 1:2.

The monomers added in the shell preparation step may include, for example, 20 to 40 parts by weight, or 25 to 40 parts by weight of an aromatic vinyl monomer; and 5 to 20 parts by weight or 10 to 20 parts by weight of a vinyl cyan monomer. Within this range, an ASA graft copolymer exhibiting excellent reaction balance and excellent properties, such as impact resistance and weather resistance, may be finally prepared.

The aromatic vinyl monomer and vinyl cyan monomer used in the shell preparation step may be, for example, the same as those used in the seed preparation step. Preferably, the aromatic vinyl monomer includes styrene, and the vinyl cyan monomer includes acrylonitrile.

In the shell preparation step, the initiator may be included in an amount of 0.01 to 3 parts by weight, or 0.01 to 1 part by weight. Within this range, polymerization stability and efficiency are excellent.

The initiator of the shell preparation step is not specifically limited so long as it is generally used in the technical field to which the present invention pertains. A fat-soluble initiator, such as cumene hydroperoxide, is preferred in terms of reaction efficiency and stability. In this case, an ASA graft copolymer having excellent properties may be generated in high yield.

In the shell preparation step, a molecular weight modifier, a grafting agent, and the like may be optionally, further included.

The molecular weight modifier may be included, for example, in an amount of 0.01 to 2 parts by weight, 0.01 to 1 part by weight, 0.01 to 0.5 parts by weight, or 0.01 to 0.1 parts by weight. In this case, polymerization stability and efficiency are improved, and an ASA graft copolymer having a desired particle size may be easily prepared.

The molecular weight modifier may be, for example, one or more of mercaptans such as tert-dodecyl mercaptan, n-dodecyl mercaptan, and n-octyl mercaptan. The molecular weight modifier preferably includes tert-dodecyl mercaptan, but the present invention is not limited thereto.

In the shell preparation step, it is preferred to previously feed the cores, an aromatic vinyl monomer, and a vinyl cyan monomer into a reactor, and then continuously feed an emulsion, which has prepared by mixing an emulsifier, initiator, a molecular weight modifier, and the like in a separate reactor, into the reactor in terms of reaction efficiency and stability improvement.

Shells obtained by the shell preparation step may have an average size of 250 to 750 nm (an average size of the shells is larger than that of the cores). The shells preferably have an average size of 300 to 750 nm, or 300 to 600 nm, more preferably an average size of 300 to 500 nm, 350 to 500 nm, or 300 to 450 nm. Within these ranges, the stability of a latex is excellent, and an ASA resin having desired properties may be prepared (in the present disclosure, an average size of the shells is larger than that of the cores)

In the method of preparing an ASA graft copolymer of the present invention, the initiator may be used along with an oxidation-reduction catalyst so as to increase reaction efficiency by promoting the activity of the initiator.

The oxidation-reduction catalyst may be, for example, may be one or more selected from the group consisting of sodium pyrophosphate, dextrose, ferrous sulfide, sodium sulfite, sodium formaldehyde sulfoxylate, and sodium ethylenediamine tetraacetate and is preferably a mixture of sodium pyrophosphate, dextrose, ferrous sulfate, but the present invention is not limited thereto.

The oxidation-reduction catalyst may be used, for example, in an amount of 0.001 to 1 part by weight, 0.001 to 0.5 parts by weight or 0.01 to 0.3 parts by weight in the shell preparation step. In this case, reaction efficiency is increased, whereby an ASA graft copolymer may be prepared in high yield.

Further, in the ASA graft copolymer latex prepared through the seed, core, and shell preparation steps, the content of coagulated material is 1% by weight or less (based on 100% by weight of the latex), preferably 0.5% by weight or less, more preferably 0.1% by weight or less. Within the above-mentioned range, the productivity of the resin may be excellent, and the mechanical strength and appearance characteristics of the resin may be improved.

The ASA graft copolymer latex obtained through the seed, core, and shell preparation steps may be prepared in a powder form through conventional processes such as coagulation, washing, and drying. For example, the ASA graft copolymer latex may be, without being limited thereto, coagulated at a temperature of 60 to 100° C. after addition of a metal salt or an acid, followed by aging, dehydration, washing, and drying processes, thereby obtaining an ASA graft copolymer powder.

In the above-described method of preparing an ASA graft copolymer, other conditions (polymerization water, polymerization conversion rate, reaction pressure, reaction time, gel content, etc.) not specified are not particularly limited so long as the conditions are within the range usually used in the technical field of the present invention, and the conditions may be appropriately selected and used as needed.

The ASA graft copolymer powder prepared according to the present invention is dispersed in a matrix resin and, accordingly, may be provided as a thermoplastic resin composition. Hereinafter, the method of preparing a thermoplastic resin composition of the present invention is described in detail.

The method of preparing a thermoplastic resin composition of the present invention may include, for example, a step of kneading 20 to 60% by weight of the ASA graft copolymer with 40 to 80% by weight of a vinyl cyan monomer-aromatic vinyl monomer copolymer, as a matrix resin. Within the above range, mechanical properties, appearance, and processability are excellent.

As another example, the method of preparing a thermoplastic resin composition of the present invention may include a step of kneading 30 to 60% by weight of the ASA graft copolymer with 40 to 70% by weight of a vinyl cyan monomer-aromatic vinyl monomer copolymer, as a matrix resin. Within this range, mechanical properties, such as impact strength and tensile strength, appearance, processability, and moldability are excellent.

As another example, the method of preparing a thermoplastic resin composition of the present invention may include a step of kneading 40 to 50% by weight of the ASA graft copolymer with 50 to 60% by weight of a vinyl cyan monomer-aromatic vinyl monomer copolymer, as a matrix resin. Within this range, a final resin composition exhibits excellent property balance.

For example, the vinyl cyan monomer-aromatic vinyl monomer copolymer may be a copolymer composed of a vinyl aromatic monomer, such as styrene and α-methyl styrene, and a vinyl cyan monomer, such as acrylonitrile, methacrylonitrile and ethacrylonitrile, without being limited thereto. Particularly, the vinyl cyan monomer-aromatic vinyl monomer copolymer may be a styrene-acrylonitrile copolymer.

For example, the vinyl cyan monomer-aromatic vinyl monomer copolymer may include 15 to 40% by weight of a vinyl cyan monomer and 60 to 85% by weight of an aromatic vinyl monomer with respect to the total weight of the copolymer. Within this range, the mechanical strength, weather resistance, and appearance of the resin composition are excellent.

As another example, the vinyl cyan monomer-aromatic vinyl monomer copolymer may include 20 to 35% by weight of a vinyl cyan monomer and 65 to 80% by weight of an aromatic vinyl monomer with respect to the total weight of the copolymer. Within this range, the mechanical strength, weather resistance, and appearance of the resin composition are excellent.

During the mixing, an additive may be further included. For example, the additive may be one or more selected from a flame retardant, a lubricant, an antimicrobial agent, a release agent, a nucleating agent, a plasticizer, a heat stabilizer, an antioxidant, a light stabilizer, a pigment, a dye, and a compatibilizer. Here, the additive may be included in an amount of 0.1 to 10 parts by weight, 1 to 7 parts by weight, or 1 to 5 parts by weight based on 100 parts by weight of the composition.

The ingredients of the thermoplastic resin composition of the present invention may be kneaded and then extruded, thereby being provided in a pellet form. The kneading and extrusion may be carried out, for example, under conditions of 200 to 300° C. and 30 to 100 rpm, or 200 to 280° C. and 30 to 70 rpm. Within these ranges, excellent processability is exhibited.

In addition, the thermoplastic resin composition of the present invention may be subjected to an injection-molding step, thereby being processed into a molded article.

For example, the injection molding may be performed at 190 to 300° C. and 30 to 80 bar or at 200 to 250° C. and 30 to 70 bar. Within this range, processability may be excellent, and desired mechanical properties and appearance characteristics may be obtained.

When the ASA graft copolymer prepared using the multifunctional carboxylic acid having 20 to 60 carbon atoms or a salt thereof, as an emulsifier, in the shell preparation step according to the present disclosure is used, latex exhibits excellent stability even when the emulsifier is used in a small amount, inherent properties, such as impact resistance, weather resistance, and processability, of the ASA graft copolymer, are highly maintained, and the appearance of a final product is improved due to considerable reduction of gas generated on a surface of a resin during a high-temperature thermoforming process such as injection molding.

As a specific example, a molded article manufactured using the ASA graft copolymer according to the present invention is allowed to stand at 260° C. for 10 minutes and then injection-molded, and, when chromaticity of the ASA molded article is measured using a spectrocolorimeter, a chromaticity change value ($\Delta E$) between chromaticity values measured before and after standing at 260° C. is more than 0 and 4 or less, 0.1 or more and 3.5 or less, or 0.1 or more and 3.3 or less. That is, the molded article exhibits excellent appearance quality.

As another example, when the molded article of the present disclosure is injection-molded, the amount of gas generated may be 1000 ppm or less, 300 to 1000 ppm, 300 to 800 ppm or 300 to 700 ppm. The gas generation amount is more preferably 570 ppm or less, 100 to 570 ppm, 100 to 550 ppm or 100 to 530 ppm. Within these ranges, the surface roughness of a resin may be excellent, whereby appearance characteristics, such as gloss and whiteness, may be improved.

Hereinafter, the present invention will be described in more detail with reference to the following preferred examples. However, these examples are provided for illustrative purposes only and should not be construed as limiting the scope and spirit of the present invention. In addition, it will be apparent to those skilled in the art that various changes and modifications may be made without departing from the spirit and scope of the present invention, and such changes and modifications are also within the scope of the appended claims.

EXAMPLE

Example 1

1. Polymeric Seed Preparation Step 6 parts by weight of butyl acrylate, 0.05 parts by weight of sodium dodecyl sulfate, 0.04 parts by weight of ethylene glycol dimethacrylate, 0.02 parts by weight of allyl methacrylate, 0.1 parts by weight of potassium hydroxide, and parts by weight of distilled water were added to a nitrogen-substituted reactor once, and temperature was raised to 70° C., and 0.04 parts by weight of potassium persulfate was added into the reactor to initiate polymerization. Polymerization was then continued for 2 hours.

The average size of the obtained rubber polymer particles after completion of the reaction was 150 nm.

2. Polymeric Core Preparation Step 44 parts by weight of butyl acrylate, 0.5 parts by weight of sodium dodecyl sulfate, 0.2 parts by weight of ethylene glycol dimethacrylate, 0.2 parts by weight of allyl methacrylate, 30 parts by weight of distilled water, and 0.05 parts by weight of potassium persulfate were mixed with the polymeric seeds. Then, the mixture was continuously added to a reactor at 70° C. for 3 hours. After completion of the addition, polymerization was further performed for 1 hour.

The average size of the obtained rubber polymer particles after completion of the reaction was 300 nm.

3. Polymeric Graft Shell Preparation Step

In the presence of the polymeric cores, a monomer mixture including 23 parts by weight of distilled water, 38 parts by weight of styrene, and 12 parts by weight of acrylonitrile; an emulsion including 0.8 parts by weight of a mixed emulsifier FS200 (LG Household & Health Care) including 80% by weight of a monocyclic difunctional carboxylic acid having 36 carbon atoms, 15% by weight of a bicyclic difunctional carboxylic acid having 54 carbon atoms, and 5% by weight of an acyclic difunctional carboxylic acid having 18 carbon atoms or less, 0.02 parts by weight of tert-dodecyl mercaptan (TDDM), and 0.05 parts by weight of cumene hydroperoxide; and a mixed liquid including 0.09 parts by weight of sodium pyrophosphate, 0.12 parts by weight of dextrose, and 0.002 parts by weight of ferrous sulfide were continuously added at 75° C. for 3 hours, and at the same time, polymerization was performed. After addition of the emulsion and the mixed liquid was completed, the mixture was further reacted at 75° C. for 1 hour to increase a polymerization conversion rate, and then cooled to 60° C. to complete the polymerization and obtain a graft copolymer latex.

The average size of the prepared graft copolymer latex was 380 nm.

4. Preparation of Graft Copolymer Powder

To prepare acrylate-styrene-acrylonitrile copolymer powder, 0.8 parts by weight of an aqueous solution of calcium chloride was added to the prepared acrylate-styrene-acrylonitrile graft copolymer latex. Then, coagulation was performed at 70° C. under atmospheric pressure, aging was performed at 93° C., dehydration and washing was performed, and drying was performed at 90° C. for 30 minutes using hot blast.

5. Preparation of Acrylic Thermoplastic Resin Composition 44 parts by weight of the graft copolymer powder, 56 parts by weight of rigid matrix styrene-acrylonitrile copolymer 90HR (including 27% by weight of acrylonitrile and 73% by weight of styrene, manufactured by LG Chem.), 1.5 parts by weight of a lubricant, 1.0 parts by weight of an antioxidant, and 1.0 parts by weight of an ultraviolet light stabilizer were added and mixed. The mixture was prepared in the form of a pellet at a cylinder temperature of 220° C. using a 36 pie extrusion type kneader, and the pellet-shaped resin was subjected to injection molding (injection molding temperature of 200 to 230° C., injection molding pressure of to 60 bar) to prepare a specimen for measuring physical properties.

Example 2

An experiment was performed in the same manner as in Example 1, except that an emulsion including 0.4 parts by weight of FS200 (LG Household & Health Care), 0.7 parts by weight of sodium rosinate, 0.02 parts by weight of TDDM, and 0.05 parts by weight of cumene hydroperoxide was used instead of the emulsion including 0.8 parts by weight of mixed emulsifier FS200 (LG Household & Health Care), 0.02 parts by weight of tert-dodecyl mercaptan (TDDM), and 0.05 parts by weight of cumene hydroperoxide in the polymeric graft shell preparation step of Example 1.

An average size of the prepared graft copolymer latex was 385 nm.

Example 3

Polymeric seeds were prepared in the same manner as in Example 1, except that sodium dodecyl sulfate was added in an amount of 0.03 parts by weight instead of 0.05 parts by weight, and 6 parts by weight of styrene were used instead of 6 parts by weight of butyl acrylate in the polymeric seed preparation step of Example 1. Using the prepared polymeric seeds, an acrylic thermoplastic resin was prepared in the same manner as in Example 1.

An average size of the prepared polymeric seeds was 300 nm, an average size of cores was 600 nm, and a final size was 750 nm.

Example 4

Polymeric seeds were prepared in the same manner as in Example 1, except that sodium dodecyl sulfate was added in an amount of 0.03 parts by weight instead of 0.05 parts by weight, and 4 parts by weight of butyl acrylate and 2 parts by weight of styrene were used instead of 6 parts by weight of butyl acrylate in the polymeric seed preparation step of Example 1. Using the prepared polymeric seeds, an acrylic thermoplastic resin was prepared in the same manner as in Example 1.

An average size of the prepared polymeric seeds was 200 nm, an average size of cores was 400 nm, and a final size was 500 nm.

Example 5

An experiment was performed in the same manner as in Example 1, except that an emulsion including 0.5 parts by weight of emulsifier AS200 (LG Household & Health Care) including 29% by weight of difunctional potassium carboxylate having 18 to 20 carbon atoms, 0.6 parts by weight of sodium rosinate, 0.02 parts by weight of TDDM, and 0.05 parts by weight of cumene hydroperoxide was used instead of the emulsion including 0.8 parts by weight of mixed emulsifier FS200 (LG Household & Health Care), 0.02 parts by weight of tert-dodecyl mercaptan (TDDM), and 0.05 parts by weight of cumene hydroperoxide in the polymeric graft shell preparation step of Example 1.

An average size of the prepared graft copolymer latex was 382 nm

Comparative Example 1

An experiment was performed in the same manner as in Example 1, except that an emulsion including 1.8 parts by weight of potassium rosinate, 0.02 parts by weight of TDDM, and 0.05 parts by weight of cumene hydroperoxide was used instead of the emulsion including 0.8 parts by weight of mixed emulsifier FS200 (LG Household & Health Care), 0.02 parts by weight of tert-dodecyl mercaptan (TDDM), and 0.05 parts by weight of cumene hydroperoxide in the polymeric graft shell preparation step of Example 1.

An average size of the prepared graft copolymer latex was 389 nm.

Comparative Example 2

An experiment was performed in the same manner as in Example 1, except that sodium dodecyl sulfate was used in an amount of 0.3 parts by weight instead of 0.05 parts by weight in the polymeric seed preparation step of Example 1.

An average size of the prepared polymeric seeds was 80 nm, an average size of cores was 150 nm, and a final size was 200 nm.

Test Example

The properties of the ASA graft copolymer prepared according to each of the examples and the comparative examples and a resin composition including the ASA graft copolymer were measured by the following methods. Results are summarized in Table 1 below.

- Average size of polymer (seed, core, shell) (nm): 1 g of a latex was mixed with 100 g of distilled water, and the average size was measured in Gaussian mode using dynamic laser light scattering in a Nicomp 380HPL (PSS•Nicomp Co., USA).
- Content of coagulum (% by weight): A latex was filtered using a 100 mesh wire filter, and a coagulum filtered on the wire mesh was dried in a hot blast drier at 100° C. for 1 hour. The weight of the dried coagulum was measured and expressed as a ratio (%) to a total amount of the used monomers and supplementary material.
- Izod impact strength (kgf/cm$^2$): The thickness of a specimen was set to ¼", and Izod impact strength was measured using a method of standard measurement ASTM 256.
- Flow index (MI: melt flow index, g/10 min): Flow index was measured at 220° C. under a load of 10 kg for 10 minutes using the ASTM D1238 method.
- Tensile strength (kg/cm$^2$): The tensile strength of a specimen was measured using a method of standard measurement, ASTM D638.
- Surface gloss: Surface gloss was measured at an angle of 45° to a specimen using a method of standard measurement, ASTM D528.
- Whiteness (whiteness index): Whiteness was measured according to the method of CIE Lab.
- TGA analysis: 0.1 g of graft copolymer powder was heated from 30° C. to 250° C. at a rate of 20° C./min under a nitrogen atmosphere, and weight loss was measured while keeping the powder at 250° C. for 1 hour. The measured weight loss was expressed by resin residue amount (%).
- Evaluation of dwelling thermal stability: The pellet prepared using an extrusion type kneader was allowed to stand in an injection molding machine at a molding temperature of 260° C. for 5 minutes. Then, to determine the degree of discoloration of the molded specimen, L', a', and b' values were measured using a spectrocolorimeter, and the degree of discoloration (ΔE) was calculated using Equation 1 below. Here, ΔE is the arithmetic mean of a CIE Lab value before and after performing an experiment of dwelling thermal stability. ΔE close to 0 indicates that thermal stability is good. (Equation 1 below, L, a, and b are values measured before dwelling in an injection molding machine).

$$\Delta E = \sqrt{(L'-L)^2 + (a'-a)^2 + (b'-b)^2} \quad \text{[Equation 1]}$$

- Measurement of gas generation amount: A total amount of volatile organic compounds generated in 1 g of ASA copolymer powder at 250° C. for 1 hour was measured using HS-GC/MSD.

TABLE 1

|  | Example 1 | Example 2 | Example 3 | Example 4 | Example 5 | Comparative Example 1 | Comparative Example 2 |
|---|---|---|---|---|---|---|---|
| SDS* | 0.05 | 0.05 | 0.03 | 0.03 | 0.05 | 0.05 | 0.3 |
| Rosinate ** | — | 0.7 | — | — | 0.6 | 1.8 | — |
| Novel emulsifier*** | 0.8 | 0.4 | 0.8 | 0.8 | 0.5 | — | 0.8 |
| Final particle diameter (nm) | 380 | 385 | 750 | 500 | 382 | 389 | 200 |
| Coagulum (% by weight) | 0.03 | 0.02 | 0.09 | 0.05 | 0.08 | 0.1 | 0.02 |
| Impact strength (kgf/cm$^2$) | 25 | 27 | 31 | 30 | 26 | 25 | 12 |
| Fluidity (g/10 min) | 10.8 | 11.2 | 10.1 | 10.4 | 11.0 | 10.7 | 11.5 |
| Tensile strength (kg/cm$^2$) | 420 | 418 | 402 | 413 | 428 | 415 | 448 |
| Surface gloss | 98.5 | 99.0 | 95.8 | 97.2 | 99.2 | 98.3 | 97.6 |

TABLE 1-continued

| | Example 1 | Example 2 | Example 3 | Example 4 | Example 5 | Comparative Example 1 | Comparative Example 2 |
|---|---|---|---|---|---|---|---|
| Whiteness | 63.4 | 63.1 | 64.4 | 64.0 | 63.5 | 60.0 | 61.2 |
| TGA (%) | 99.6 | 99.5 | 99.7 | 99.6 | 99.4 | 98.0 | 98.5 |
| ΔE | 3.3 | 3.2 | 2.9 | 3.0 | 3.2 | 5.3 | 4.2 |
| Gas generation amount (ppm) | 530 | 540 | 525 | 528 | 580 | 1080 | 1020 |

SDS*: Parts by weight of sodium dodecyl sulfate added in seed preparation step
rosinate **: Parts by weight of rosinate added in shell preparation step
Novel emulsifier***: Parts by weight of FS200 or AS200 added in shell preparation step As shown in Table 1, it can be confirmed that, in the case of the ASA graft copolymers according to the present invention (Examples 1 to 5), the content of coagulum is considerably low and a polymer having a desired average size is formed although the emulsifier is used in a small amount, compared to Comparative Example 1 not according to the present invention. From this result, it can be confirmed that the emulsifier of the present disclosure greatly contributes to increase in polymerization stability and latex stability.

In addition, it can be confirmed that, in the case of the resin compositions (Examples 1 to 5) prepared using the ASA graft copolymers according to the present invention, impact strength, tensile strength, and fluidity are highly maintained, and surface gloss, whiteness (colorability is excellent with increasing whiteness), thermal stability, and the like are further improved, compared to Comparative Example 1 not according to the present invention.

In particular, it can be conformed that, in the case of the specimens of Examples 1 to 5 according to the present invention, the amount of gas generated during injection molding is greatly decreased, compared to the comparative examples. In addition, it can be confirmed that, even when total use amounts of the emulsifiers used are the same, the specimens according to the present invention exhibit much lower gas generation amount.

Further, it can be confirmed that, since the emulsifier is used in an excessive amount, compared to Example 1, in the seed preparation step of Comparative Example 2 although the novel emulsifier according to the present invention is used in the shell preparation step of Comparative Example 2, a small-diameter polymer is prepared, a large amount of gas is generated, and properties, such as impact strength, are deteriorated.

The invention claimed is:

1. A method of preparing an ASA graft copolymer, the method comprising:
   a) a seed preparation step of preparing seeds by polymerizing one or more monomers selected from among an aromatic vinyl monomer, a vinyl cyan monomer, and an alkyl acrylate monomer and an emulsifier;
   b) a core preparation step of preparing cores enclosing the seeds by adding an alkyl acrylate monomer in presence of the seeds and performing polymerization; and
   c) a shell preparation step of preparing shells enclosing the cores by adding an aromatic vinyl monomer, a vinyl cyan monomer, and an emulsifier in presence of the cores and performing graft polymerization,
   wherein the emulsifier of the shell preparation step comprises a multifunctional carboxylic acid having 20 to 60 carbon atoms or a salt thereof and multiple functional groups, and an average size of the shell is 250 to 750 nm and is larger than an average size of the cores.

2. The method according to claim 1, wherein two or three acid carboxyl groups are comprised in a structure of the multifunctional carboxylic acid.

3. The method according to claim 1, wherein the multifunctional carboxylic acid having 20 to 60 carbon atoms or a salt thereof is comprised in an amount of 30 to 100% by weight based on a total weight of the emulsifier used in the shell preparation step.

4. The method according to claim 1, wherein the emulsifier of the shell preparation step comprises a multifunctional carboxylic acid having 20 to 60 carbon atoms or a salt thereof; and a monocarboxylate having 10 to 20 carbon atoms.

5. The method according to claim 4, wherein the emulsifier of the shell preparation step comprises the multifunctional carboxylic acid having 20 to 60 carbon atoms or a salt thereof and the monocarboxylate having 10 to 20 carbon atoms in a weight ratio of 1:0.1 to 1:10.

6. The method according to claim 1, wherein, in the seed preparation step, 4 to 30 parts by weight of a monomer comprising one or more selected from among an aromatic vinyl monomer, a vinyl cyan monomer, and alkyl acrylate and 0.005 to 0.5 parts by weight of an emulsifier, based on 100 parts by weight of a sum of the monomers used to prepare the copolymer, are used to prepare the seeds.

7. The method according to claim 6, wherein an average size of the seeds is 90 to 400 nm.

8. The method according to claim 1, wherein, in the core preparation step, 30 to 60 parts by weight of an alkyl acrylate monomer and 0.01 to 1 part by weight of a crosslinking agent are used in presence of the seeds to prepare the cores.

9. The method according to claim 8, wherein the crosslinking agent comprises an acrylic crosslinking agent.

10. The method according to claim 8, wherein an average size of the cores is 180 to 600 nm and is larger than an average size of the seeds.

11. The method according to claim 1, wherein, in the shell preparation step, 30 to 60 parts by weight of an aromatic vinyl monomer and a vinyl cyan monomer and 0.1 to 3 parts by weight of an emulsifier are graft-polymerized in presence of the cores to prepare the shells.

12. A method of preparing a thermoplastic resin composition, the method comprising a step of kneading 20 to 60% by weight of the ASA graft copolymer prepared by the method according to claim 1 and 40 to 80% by weight of a vinyl cyan monomer-aromatic vinyl monomer copolymer.

13. The method according to claim 12, wherein, when the kneading is performed, one or more additives selected from the group consisting of a flame retardant, a lubricant, an antibacterial agent, a release agent, a nucleating agent, a plasticizer, a heat stabilizer, an antioxidant, a light stabilizer, a pigment, a dye, and a compatibilizer are further comprised.

14. A method of manufacturing a molded article, the method comprising a step of injection-molding the thermoplastic resin composition prepared by the method according to claim 12.

15. The method according to claim 14, wherein the molded article is allowed to stand at 260° C. for 10 minutes and then injection-molded, and, when chromaticity of the ASA molded article is measured using a spectrocolorimeter, a chromaticity change value (ΔE) between chromaticity values measured before and after standing at 260° C. is more than 0 and 4 or less.

16. The method according to claim 14, wherein, when the injection-molding is performed, a gas generation amount is 1,000 ppm or less.

* * * * *